United States Patent [19]

McConnell

[11] 4,072,615
[45] Feb. 7, 1978

[54] RECEIVER DRYER FOR A REFRIGERATION SYSTEM

[75] Inventor: William W. McConnell, Hagerstown, Ind.

[73] Assignee: Ford Aerospace & Communications Corporation, Dearborn, Mich.

[21] Appl. No.: 719,883

[22] Filed: Sept. 1, 1976

[51] Int. Cl.² .................................................. B01D 27/02
[52] U.S. Cl. ..................................... 210/282; 55/387; 62/474
[58] Field of Search ............... 55/33, 35, 387; 62/474; 210/41, 282, 443, 445, 451

[56] References Cited

U.S. PATENT DOCUMENTS

| 2,041,043 | 5/1936  | Bennett | 210/451 |
| 2,623,607 | 12/1952 | Bottum  | 210/282 |
| 3,051,317 | 8/1962  | Muth    | 210/445 |
| 3,347,385 | 10/1967 | Russell | 210/451 |
| 3,545,227 | 12/1970 | Grahl   | 62/474  |
| 4,009,714 | 3/1977  | Hammer  | 210/445 |

Primary Examiner—Thomas G. Wyse
Assistant Examiner—Ivars Cintins
Attorney, Agent, or Firm—William E. Johnson; Keith L. Zerschling

[57] ABSTRACT

A receiver dryer for a refrigeration system is disclosed. A receiver dryer body is formed in an extrusion operation. The body contains structure defining at least a pair of passageways and structure for mounting a desiccant containing device between such passageways. End caps are provided for closing top and bottom ends of the body. These end caps contact opposite ends of the desiccant containing device whereby the desiccant containing device forms a barrier between the pair of passageways. Fitting members are provided which are connectable to the passageways through the end caps to permit flow of a fluid through the device. The fluid enters a first fitting and proceeds through a first passageway into a compartment on one side of the desiccant containing device. The fluid flows through the desiccant containing device into a second compartment and is removed from the second compartment by flowing out through the second fitting member. The flow from the second compartment may be through the open passageway contained in that compartment.

4 Claims, 4 Drawing Figures

U.S. Patent
Feb. 7, 1978
4,072,615
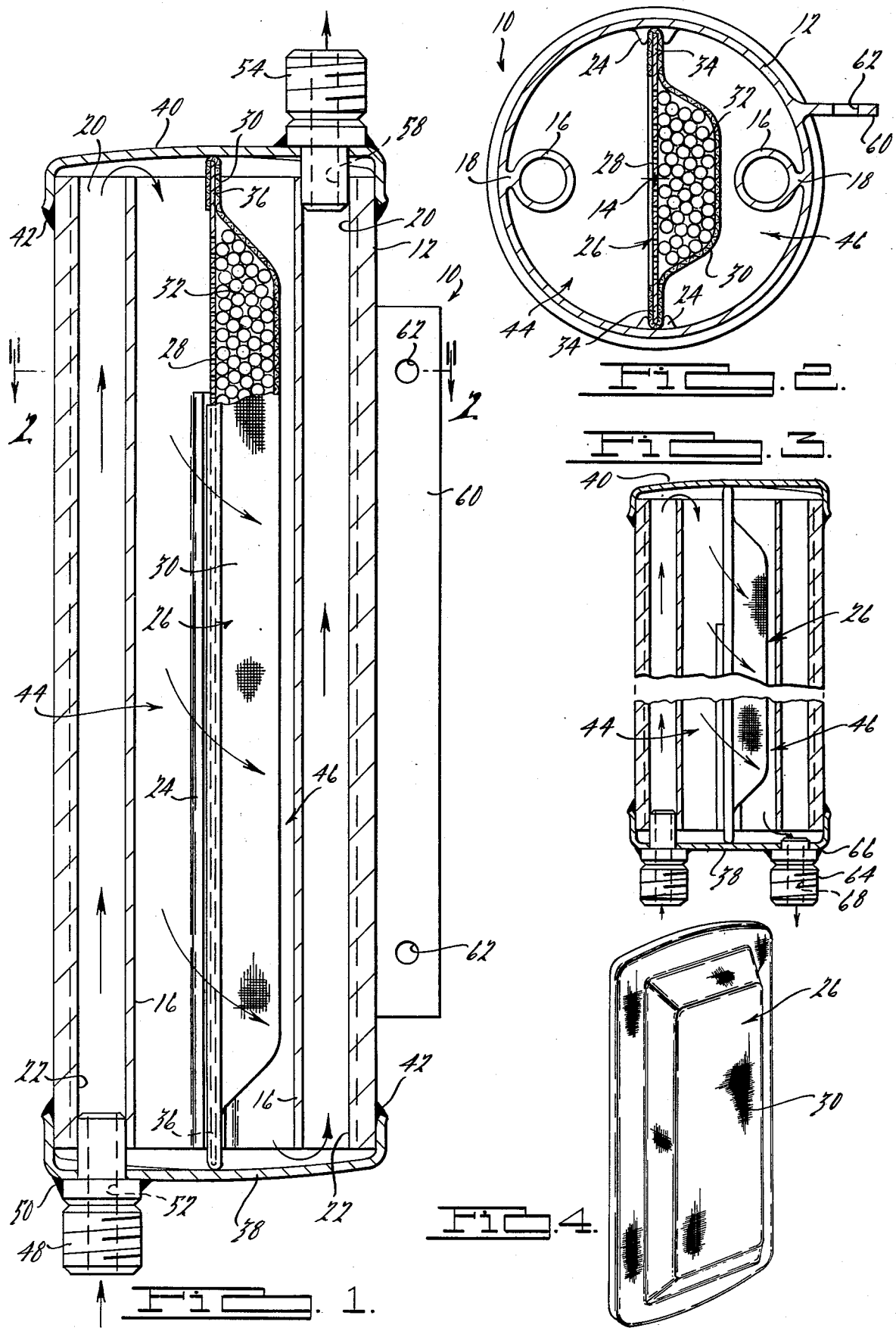

RECEIVER DRYER FOR A REFRIGERATION SYSTEM

BACKGROUND OF THE INVENTION

Most refrigeration systems, both domestic and commercial, include receiver dryer units for the refrigerant of the system. The drying of the refrigerant is accomplished by passing the refrigerant through a bed of drying material, such as silica gel or activated alumina. Drying is required because water vapor may leak into or enter the system during its installation or repair, and, if not removed, will freeze out at the refrigerant control and either destroy the efficiency of the control of completely block further refrigerant control. Moisture is also harmful in such a system because it can react to form acids with the refrigerant which will cause harmful corrosion.

It is the principal purpose of this invention to provide a receiver dryer for a refrigeration system which is extremely simple in construction but yet efficient in operation. The receiver dryer of this invention is particularly suitable for use in automotive air conditioning systems and is readily adapted to be located in any number of positions in association with such an air conditioning unit.

A preliminary novelty study conducted on the subject matter of this application resulted in the citation of the following U.S. Pat. Nos. 2,557,557; 2,623,607; 3,545,227; and 3,841,490.

SUMMARY OF THE INVENTION

This invention relates to a receiver dryer and, more particularly, to a receiver dryer for a refrigeration system which is extremely simple in construction and economical to manufacture.

In accordance with the teachings of this invention, a receiver dryer for a refrigeration system has a receiver dryer body formed in an extrusion operation. This receiver dryer body has several characteristics including (a) a central axis extending along the interior length thereof, (b) passageway defining structure formed as an integral portion of the extruded receiver dryer body which defines at least a pair of open passageways extending along the interior length of the receiver dryer body in the same direction as the central axis thereof, and (c) retention rib defining structure formed as an integral portion of the extruded receiver dryer body defining at least two sets of retention ribs extending along the interior length of the receiver dryer body in the same direction as the central axis thereof, the two sets of retention ribs defining the lateral side edges of a plane which is interposed between the pair of open passageways.

A desiccant receiving device includes a planar structural member having a plurality of openings therein. The device also has a porous screen portion bonded to the planar structural member and defining therewith an open volume which can contain a granular desiccant therein. The planar structural member has opposite lateral edges thereof received in opposite sets of the retention ribs of the receiver dryer body and opposite end edges extending beyond both ends of the receiver dryer body whereby the desiccant receiving device defines a barrier between the pair of open passageways. A granular desiccant is located in the open volume of the desiccant receiving device.

A pair of end caps close off opposite ends of the receiver dryer body. The opposite end edges of the planar structural member of the desiccant receiving device engages the interior surface of each of the end caps across an entire length of the end cap to thereby define first and second compartments on each side of the desiccant receiving device within the receiver dryer body, each compartment being associated with one of the open passageways.

A first fitting member is secured to one of the end caps. This member defines a passageway through the one end cap connected to the open passageway in a first compartment whereby a fluid to be treated may flow through the passageway of the first fitting member and the open passageway to reach the first compartment.

A second fitting member is secured to one of the end caps and defines a passageway through the end cap to the second compartment. Thereby fluid in the first compartment can flow through the desiccant receiving device into the second compartment and out from the second compartment through the opening defined by the second fitting member.

In accordance with particular embodiments of the structure of this invention, the second fitting member is secured to the opposite one of the end caps than is the first fitting member secured to. This second fitting member defines a passageway through the end cap connected to the open passageway contained in the second compartment.

In still another embodiment, the second fitting member is secured to the same end cap as the first fitting member. This second fitting member may define a passageway through the end cap which is connected to the open passageway in the second compartment.

BRIEF DESCRIPTION OF THE DRAWINGS

FIG. 1 is an elevational view, mainly in cross section, of a receiver dryer formed in accordance with a preferred teaching of this invention.

FIG. 2 is a plan view, in cross section, taken along the line 2—2 of FIG. 1 showing the cross section of the receiver dryer of the preferred form of this invention.

FIG. 3 is an elevational view, in cross section, of an alternate embodiment of the receiver dryer of this invention.

FIG. 4 is an isometric view of a desiccant receiving device employed in the receiver dryer structure of this invention.

DESCRIPTION OF THE PREFERRED EMBODIMENTS

In FIGS. 1 and 2, the preferred form of the receiver dryer for a refrigeration system is generally identified by the numeral 10. This receiver dryer is designed to be used in drying the refrigerant used in a refrigeration system. In particular, the receiver dryer is designed for use with an air conditioning system for an automotive vehicle. It has particular utility in this use because of the fact that the feed and return lines may be on opposite or the same ends of the receiver dryer and the receiver dryer may be mounted at any attitude desired in association with the air conditioning system.

In general, the principal portion of the receiver dryer is a receiver dryer body 12. In the preferred embodiment, this receiver dryer body has a circular cross section about a central axis 14 (shown only in FIG. 2) which extends along the interior length of the receiver dryer body.

The receiver dryer body 12 also has a pair of passageway defining structures 16—16 which have central axes extending along in the same direction as the central axis 14 of the receiver dryer body 12. These passageway defining structures 16 are connected to the main body of the receiver dryer body 12 by means of attachment structures 18—18 (shown only in FIG. 2). Each of the passageway defining structures 16 has an open top portion 20 and an open bottom portion 22.

The receiver dryer body 12 also has at least two sets of retention ribs 24 (shown only in FIG. 2). These retention ribs extend along the interior length of the receiver dryer body generally in parallel relationship with the central axis 14 of the receiver dryer body. The two sets of retention ribs define the lateral edges of an imaginary plane which is interposed between the pair of open passageway defining structures 16—16. As is readily apparent from an inspection of FIGS. 1 and 2, any cross section taken perpendicular to the central axis 14 of the receiver dryer body 12 shows an identical cross section. Thus, this receiver dryer body 12 may be formed in an extrusion operation in which an extrudable material such as aluminum is passed through a die configuration to generate the final cross section on a continuous basis. Thus, the receiver dryer body 12 is formed in a simple extrusion operation in which the outer shell of the body is formed, the attachment structure 18 and the passageway defining structures 16 are formed and the retention ribs 24 are formed. Thus, the receiver dryer body 12 is formed in a simple extrusion operation and, therefore, is very economical to fabricate.

A desiccant receiving device generally indicated by the numeral 26 and best shown in FIG. 4 is contained within the receiver body 12. The desiccant receiving device 26 includes a planar structural member 28 which has a plurality of small openings therein for permitting refrigerant to flow therethrough. The planar structural member has a porous screen 30 formed of a material such as aluminum screen wrapped therearound and spaced therefrom on one side thereof to define an open volume. This open volume is filled with a granular desiccant 32.

As seen only in FIG. 2, the planar structural member 28 has opposite lateral edges thereof 34—34 with screen 30 wrapped therearound received in opposite sets of the retention ribs 24—24. As best seen in FIG. 1, opposite end edges 36—36 of the planar structural member 28 of the desiccant receiving device 26 have screen 30 wrapped therearound and extend beyond both ends of the receiver dryer body 12. By this action, the desiccant receiving device 26 defines a barrier between the pair of passageway defining structures 16—16.

A lower end cap 38 and an upper end cap 40 (shown only in FIG. 1) are formed from an aluminum stamping for the purpose of closing off opposite ends of the receiver dryer body 12. These caps are bonded to the receiver dryer body, for example, by a heli-arc welding operation which provides suitable weldments 42—42 to secure the caps and seal off the body. The opposite end edges 36 of the planar structural member 28 of the desiccant receiving device 26 are in engagement with an internal diameter across the internal surface area of the end caps 38 and 40 thereby to define a first compartment generally designated by the numeral 44 on the lefthand side of the desiccant receiving device 26 and a second compartment generally designated by the numeral 46 on the other side of the desiccant receiving device. Each of the compartments 44 and 46 are associated with a single one of the pair of passageway defining structures 16—16.

A first fitting member structure 48 formed of aluminum is heli-arc welded by weldment 50 to the lower end cap 38. A first passageway 52 is formed through the first fitting member 48 and is connected directly to the passageway formed in the bottom portion 22 of the first one of the passageway defining structures 16.

A second fitting member 54 formed of aluminum is heli-arc welded by weldment 56 to the upper end cap 40. This second fitting member 54 has a second passageway 58 formed therethrough which is connected directly to the top portion 20 of the passageway formed in the other passageway defining structure 16.

The refrigerant utilized in the refrigeration system is passed through the receiver dryer in the following manner. The fluid enters the passageway 52 formed in the first fitting member 48 and flows upwardly through the passageway formed in the first passageway defining structure 16. When it reaches the top of this flow path, it flows into engagement with the interior surface of the upper end cap 40 and is directed into the first compartment 44. The fluid is now free to flow through the desiccant receiving device 26 and the granular desiccant 32. After the fluid passes through the desiccant receiving device 26 it is delivered into the second compartment 46. The fluid now flows downwardly in that compartment until it engages an interior surface of the lower end cap 38 which directs the same into the passageway of the second passageway defining structure 16. This flow path, in turn, delivers the fluid to the second passageway 58 of the second fitting member 54 so that it may be returned for service in the refrigeration system. The flow path described is the preferred structure for the receiver dryer 10 of this invention.

In order to support the receiver dryer for use in an automotive vehicle or other such use, an attaching structure 60 may be provided. This attaching structure can have openings 62—62 therein for the purpose of providing mounting holes. This attaching structure may be extruded with the main receiver dryer body and have opposite ends thereof removed so that the lower end cap 38 and upper end cap 40 may be attached to the receiver dryer body 12.

In FIG. 3 an alternate form of this invention is disclosed. This structure is similar in all respects to the structure shown in FIGS. 1 and 2 with the sole exception that the upper end cap 40 does not have the second fitting member 54 associated therewith. In this alternate form, a second fitting member 64 is heli-arc welded by weldment 66 to the lower end cap 38. A second passageway 68 is provided through the second fitting member 64 and is connected directly to the second compartment 46. In this embodiment after the fluid has flowed through the desiccant receiving device 26, it is delivered into the second compartment 46 and flows directly thereout by flowing into the second passageway 68 of the second fitting 64.

As an alternate embodiment, the second fitting member may be secured to the lower end cap 38 and may define a passageway which extends and is in communication with the passageway formed in the passageway defining structure 16 located in the second compartment 46.

There has been described herein a receiver dryer for a refrigeration system which is extremely simple to construct. Since the construction is simple in design, it is relatively inexpensive to manufacture.

In view of the teachings of this specification, those skilled in the art will be able to develop many modifications of the disclosed receiver dryer structure which fall within the true spirit and scope of this invention. It is intended that all such structures be included within the scope of the appended claims.

What I claim is:

1. A receiver dryer for a refrigeration system which comprises:

a receiver dryer body formed in an extrusion operation and having (a) a central axis extending along the interior length thereof, (b) passageway defining means formed as an integral portion of the extruded receiver dryer body for defining at least a pair of open passageways extending along the interior length of said receiver dryer body, and (c) retention rib defining means formed as an integral portion of said extruded receiver dryer body for defining at least two sets of retention ribs extending along the interior length of said receiver dryer body, said two sets of retention ribs defining the lateral edges of a plane which is interposed between said pair of open passageways;

a desiccant receiving device including a planar structural member having a plurality of openings therein and a porous screen portion bonded to said planar structural member and defining therewith an open volume for receiving a granular desiccant therein; said planar structural member having opposite lateral side edges thereof received in opposite sets of said retention ribs of said receiver dryer body and opposite end edges extending beyond both ends of said receiver dryer body whereby said desiccant receiving device defines a barrier between said pair of open passageways;

a granular desiccant located in said open volume of said desiccant receiving device;

a pair of end caps closing off opposite ends of said receiver dryer body, said opposite end edges of said planar structural member of said desiccant receiving device engaging the interior surface of each of said end caps to thereby define first and second separate compartments on each side of said desiccant receiving device with each compartment associated with one of said open passageways;

a first fitting member means secured to one of said end caps for defining a passageway through said one end cap connected to one of said open passageways, whereby a fluid to be treated may flow through said passageway of said first fitting member means and one of said open passageway to reach said first compartment; and a second fitting member means secured to one of said end caps for defining a passageway through said end cap to said second compartment whereby said fluid in said first compartment can flow through said desiccant receiving device into said second compartment and out from said second compartment through said opening defined by said second fitting member means.

2. The receiver dryer of claim 1 wherein: said second fitting member means is secured to the opposite one of said end caps as said first fitting member means, and wherein said second fitting member means is for defining a passageway through said end caps connected to said open passageway contained in said second compartment.

3. The receiver dryer of claim 1 wherein: said second fitting member means is secured to the same end cap as said first fitting member means, and wherein said second fitting member means is for defining a passageway through said end caps connected to said second compartment.

4. The receiver dryer of claim 3 wherein: said second fitting member means is for defining a passageway through said second end cap connected to said open passageway in said second compartment.

* * * * *